Figure 1:
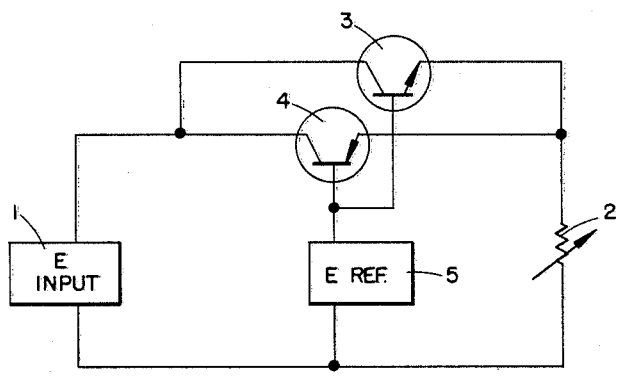

Oct. 13, 1964  G. N. KLEES  3,153,187
TRANSISTOR ALTERNATING-CURRENT VOLTAGE REGULATOR
Filed Nov. 29, 1957  2 Sheets-Sheet 1

INVENTOR.
GEORGE N. KLEES
BY John A. Duffy

AGENT

Oct. 13, 1964 G. N. KLEES 3,153,187
TRANSISTOR ALTERNATING-CURRENT VOLTAGE REGULATOR
Filed Nov. 29, 1957 2 Sheets-Sheet 2

INVENTOR.
GEORGE N. KLEES
BY John A. Duffy

AGENT

United States Patent Office 3,153,187
Patented Oct. 13, 1964

3,153,187
TRANSISTOR ALTERNATING-CURRENT
VOLTAGE REGULATOR
George N. Klees, La Habra, Calif., assignor to
North American Aviation, Inc.
Filed Nov. 29, 1957, Ser. No. 699,627
2 Claims. (Cl. 323—22)

This invention relates to voltage regulated power supplies and more particularly to a transistorized circuit for controlling the supply of current from an alternating-current source to a load to minimize changes in the load voltage.

Precision voltage regulating devices are well-known and are used extensively in circuits which require minimum changes in load voltage. The purpose of voltage regulation is to keep the voltage supply to the load constant for changes in load current or changes in input voltage, both of which tend to change the output voltage.

It is conventional in direct-current voltage regulation to employ a regulating device in series with a load and to control the flow of current therethrough by applying a regulating signal proportional to the change in load voltage to control the regulating device to cause it to control the current supplied to the load. A typical and well-known voltage regulator is a series type which utilizes a transistor as a regulating device inserted in series between the source and the load. Voltage changes across the load are amplified by a transistor amplifier and presented to the base of a regulating transistor which controls the current supplied to the load in response thereto. Load voltage changes are thus minimized. The series type regulators can be designed to give a low internal impedance and low voltage output with the inherent ability to withstand large current surges and transients in the circuit.

Series type voltage regulators utilizing transistors as described above have had many applications in direct-current voltage regulation circuits. Regulators in the past, however, have been limited to direct-current voltage regulation only as can be readily seen from the inherent characteristics of a transistor operating in series between a source and a load as in a series regulator of passing current in one direction only. Thus, it is obvious that this principle cannot be utilized in an alternating-current regulator. Some means must be provided for regulating the alternating current flowing from the source to the load. Present-day alternating-current voltage regulators utilize constant output voltage transformers which are limited in application. While the operation of these transformers to regulate alternate-current voltage is satisfactory for some applications, the size of the transformer necessary to control large currents severely limits its utility in many applications.

The present invention contemplates a transistorized alternating-current voltage regulator utilizing the principles of series type regulation to provide a voltage regulator of improved operating and physical characteristics. A pair of current paths between an alternating-current source and a load are provided to control the flow of current. The current passes through one path during the positive half cycle of operation and through the other path during the negative half cycle of operation. The advantages of series type regulators in accuracy, efficiency, and better physical characteristics are incorporated in the alternating-current regulator of this invention.

It is therefore an object of this invention to provide a transistorized alternating-current voltage regulator.

It is another object of this invention to provide an alternating-current voltage regulator capable of supplying large currents to a load from a source.

It is still another object of this invention to provide an alternating-current voltage regulator with improved operating characteristics.

It is a further object of this invention to provide an alternating-current voltage regulator independent of frequency changes in the circuit.

Figure 3:
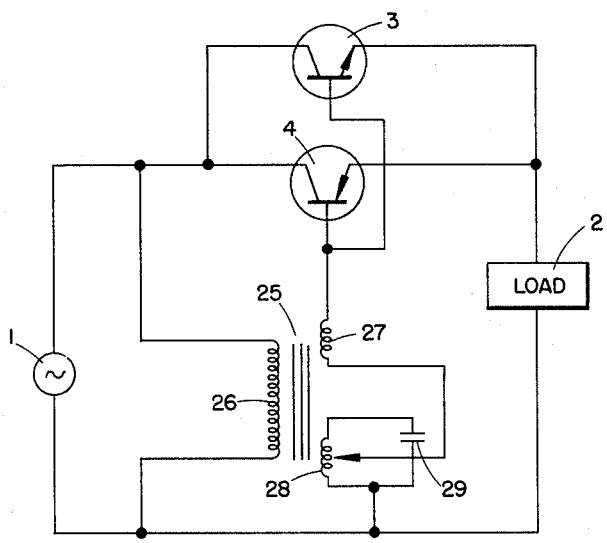
Figure 2:
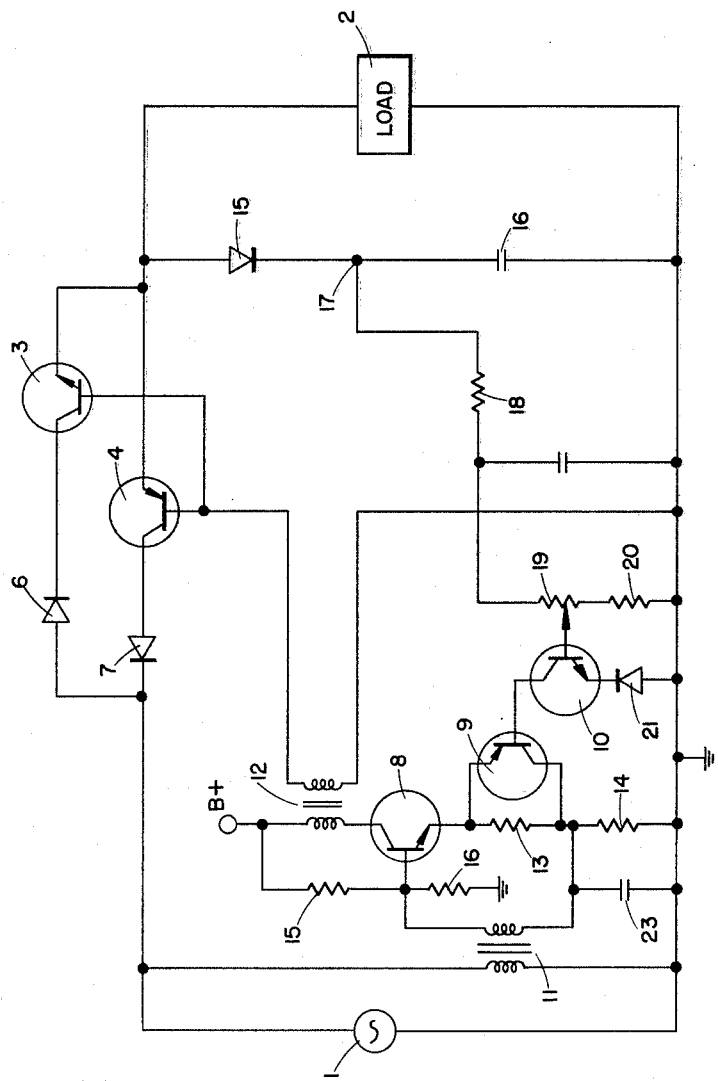

Other objects of this invention will become apparent from the following description taken in connection with the accompanying drawings in which FIG. 1 is a schematic diagram partly in block illustrating the principles of the invention;

FIG. 2 is a schematic diagram of one embodiment of the invention utilizing a gain control amplifier to provide the reference voltage; and FIG. 3 is an alternative embodiment of the invention utilizing a constant voltage transformer as the reference voltage in the circuit.

Referring to FIG. 1, an alternating-current input source 1 which may vary in potential supplies a current to a load 2 which may vary in impedance. Current source 1 may be any alternating-current unregulated voltage source. In series with current source 1 and load 2 and connected to form a pair of current paths are a pair of opposite type transistors 3 and 4. Transistor 3 is shown as an n-p-n type transistor to provide a current path during the positive half cycle of operation and transistor 4 is a p-n-p transistor connected to provide a current path for the negative half cycle of operation. The collectors of transistors 3 and 4 are connected in common to one terminal of source 1 and the emitters are connected in common to one terminal of load 2. Reference source 5 which may be of any type alternating-current voltage reference is connected between the base of transistor 4 and the other terminal of load 2 to provide a predetermined reference alternating-current voltage for transistors 4 and 3. The bases of transistors 3 and 4 are connected in common to reference source 5.

In operation during the positive half cycle, transistor 3 provides a current path between input source 1 and load 2, current flowing from source 1 through the collector-emitter circuit of transistor 3 through load 2 and back to the other side of source 1. Assume now that the impedance of load 2 changes, for example, increases, tending to cause an increase in voltage across load 2. As the voltage across load 2 increases during the positive half cycle of operation, the voltage between the emitter and base of transistor 3 increases since the base is maintained at a constant voltage by reference 5 while the emitter changes with load 2. An increase in voltage between the emitter and base of transistor 3 causes the current to decrease through the collector-emitter circuit, thereby reducing the current supplied to load 2 which tends to lower the voltage until it reaches a value equal to reference source 5. During this positive half cycle of operation the current path through transistor 4 is inoperative since the positive potential presented to the collector with respect to the emitter will not allow current to flow through transistor 4. During the negative half cycle of operation, assuming as before, an increase in voltage across load 2, transistor 4 which is now supplying the current from source 1 to load 2 senses the increase in voltage across load 2 at its emitter with respect to its base which is maintained at a constant potential. Transistor 4 reduces the current supplied to load 2 in response to the change in potential between its emitter and base, thereby tending to return the voltage across load 2 to the value of reference 5.

Turning now to FIG. 2 there is shown the principal embodiment of this invention incorporating the principles described in FIG. 1. In FIG. 2, current paths are provided through transistors 3 and 4 between source 1 and load 2 for the positive and negative half cycles of operation as described in FIG. 1. Diode 6 in the current path with transistor 3 and diode 7 in the current path with transistor 4 have been inserted to prevent the base current in either of transistors 3 and 4 from conducting through their respective collectors during the non-conducting half cycle of operation of each transistor. Thus, for example, during the positive half cycle of operation when the current path of transistor 4 is off, diode 7 is biased to prevent conduction from the base to collector of transistor 4 which might occur due to the relative positive potential between the base and the collector. Diode 6 operates in a similar manner during the negative half cycle of operation. Connected to supply the control current to the bases of transistors 3 and 4 during regulation is a circuit comprising transistors 8, 9, and 10 which combine to provide gain control to transistor 8 in response to the voltage across load 2 as compared to a reference voltage. Transistor 8 receives an input signal from the secondary of transformer 11 which has its primary connected across input source 1. The collector of transistor 8 is connected through the primary of transistor 12 to B+ and through resistors 13 and 14 to ground. An operating direct-current bias is established on the base of transistor 8 by the circuit comprising resistors 15 and 16 connected in series with B+ and ground and having their junction connected to the base of transistor 8. The secondary of transformer 12 connects the bases of transistors 3 and 4 in common to ground. A feedback circuit to provide gain control of transistor 8 is provided by the circuit comprising rectifier 15 and capacitor 16 which present a rectified alternating current at point 17 which is fed through resistors 18, 19, and 20 to ground, establishing a potential between the base of transistor 10 and its emitter proportional to the voltage across load 2. The emitter of transistor 10 is provided with a reference potential by connecting it through zener diode 21 to ground. Any change in the current through resistor 19 establishes a change in potential between the base of transistor 10 and its emitter proportional to the difference of voltage across load 2 and the voltage across diode 21. The collector of transistor 10 is connected to the base of transistor 9. Transistor 9 operates as a shunting circuit for resistor 13 in the circuit of the emitter of transistor 8. Transistor 9 has its emitter connected to one end of resistor 13 and its collector connected to the other end. Capacitor 23 is connected across resistor 14 to provide a low impedance to ground for the alternating-current component resulting from the alternating-current input signal to the base of transistor 8. Transistor 9 operates as a low impedance bypass circuit for the emitter current of transistor 8.

In operation of the circuit shown in FIG. 2, a change in voltage across load 2 provides a corresponding change in the potential between the base and emitter of transistor 10 which in turn controls the impedance of the circuit through transistor 9. A deviation in the potential in the emitter of transistor 10 from the predetermined reference level established by diode 21 will in turn, cause a corresponding change in impedance in the emitter-collector circuit of transistor 9 directly proportional to the change in potential. A change in impedance in transistor 9 operates to change the effective impedance to the flow of current in the emitter circuit of transistor 8. A change in effective impedance in the emitter circuit of transistor 8 changes the voltage gain of the transistor proportionately, which in turn changes the potential across the primary of transformer 12 in the collector circuit. The change in potential across the primary of transistor 12 is reflected to the secondary which in turn changes the driving current supplied to the bases of transistors 3 and 4. Thus, for example, an increase in voltage across load 2 increases the potential of the base of transistor 10 with respect to its emitter providing an increase in the flow of current through transistor 10 and from the base of transistor 9 which increases the impedance presented by transistor 9 to the flow of current in the emitter circuit of transistor 8. Increasing the effective impedance in the emitter circuit decreases the gain of transistor 8 thereby decreasing the current in the secondary of transformer 12 which causes a corresponding decrease in base current supplied to transistors 3 and 4, thereby decreasing the flow of current from source 1 to load 2 tending to reduce the voltage across load 2 to the reference level.

The circuit of FIG. 2 is particularly applicable in circuits where the frequency of the input source 1 is not constant. Controlling the gain of transistor amplifier 8 to vary the base current to transistors 3 and 4 produces a regulation operation which will not vary significantly with a change in frequency at input source 1 since the gain of transistor 8 is relatively insensitive to the frequency of the input signal applied to its base.

Turning now to FIG. 3 there is shown an alternative embodiment of the invention which provides a constant voltage transformer to supply the reference voltage to the bases of transistors 3 and 4. Constant voltage transformer 25 comprises a primary 26 connected across input source 1, a compensating secondary winding 27 and a resonant secondary winding 28. Winding 27 is connected between the bases of transistors 3 and 4 and an intermediate point on winding 28 to provide an auto-transformer type action in the output of transformer 25. The core of transformer 25 is constructed so as to provide a relative high flux density. Resonant circuit winding 28 is shunted by a capacitor 29 to operate in a state of resonance. The flow of a stable resonant current tends to stabilize the value of flux in the core of transformer 25. A change in voltage across primary winding 26 will not change appreciably the flux in the core of transformer 25, therefore causing no appreciable change in the output voltage across winding 27. Thus it can be seen that a constant voltage and current is supplied to the base of transistors 3 and 4 by constant voltage transformers 4 and 5.

In operation of FIG. 3 a change in voltage across load 2 causes the ratio of emitter to base potential of transistors 3 and 4 to change in accordance therewith, thereby causing a change in current through the collector-emitter paths of transistors 3 and 4 during their alternate half cycles of operation. This change in current is such as to return the voltage across load 2 to the reference level. The embodiment of FIG. 3 is applicable to circuits which have a relative low power requirement and which have a substantially constant frequency input signal.

Although the invention has been described and illustrated in detail it is to be clearly understood that the same is by way of illustration and example only and is not to be taken by way of limitation, the spirit and scope of this invention being limited only by the terms of the appended claims.

I claim:

1. An alternating-current voltage regulator comprising first and second transistors of opposite types connected in parallel between an alternating-current source and a load, the collector-emitter path of one of said transistors connected to form a first current path between said source and said load during positive half cycles of conduction, the emitter-collector path of the other said transistor connected to form a second current path between said source and said load during negative half cycles of conduction, and regulating means for impressing upon the emitter with respect to the base of each said transistor a potential having variations corresponding to load voltage changes for controlling the current supplied to said load through said current paths, said regulating means comprising a third transistor having its base connected to receive a signal from said alternating-current source and its collector connected to supply a base current to said first and second transistors, and means responsive to a change in voltage across said load for varying the gain of said third transistor, the current supplied to said bases by the collector of said third transistor varying in accordance with changes in gain of said third transistor.

2. An alternating-current voltage regulator comprising first and second transistors of opposite types connected in parallel between an alternating-current source and a load, the collector-emitter path of one of said transistors connected to form a first current path between said source and said load during postive half cycles of operation, the emitter-collector path of the second said transistor connected to form a second current path between said source and said load during negative half cycles of operation, a transformer having at least a primary and a secondary winding, a third transistor having its collector-emitter circuit connected through the primary of said transformer to control the flow of current through said transformer, the secondary winding of said transformer being connected in common between the base circuits of both said first and second transistors and one side of said alternating-current source to provide a control circuit for controlling the current flowing through the collector-emitter circuits of said first and second transistors, the base of said third transistor being responsively connected to receive a signal proportional to the change in voltage across said load whereby the current flowing through the collector-emitter circuit of said third transistor and the primary of said transformer varies in accordance with changes in voltage across said load.

References Cited in the file of this patent
UNITED STATES PATENTS

| | | |
|---|---|---|
| 2,562,744 | Schultz | July 31, 1951 |
| 2,691,745 | Rockafellow | Oct. 12, 1954 |
| 2,693,568 | Chase | Nov. 2, 1954 |
| 2,716,729 | Shockley | Aug. 30, 1955 |
| 2,751,549 | Chase | June 19, 1956 |
| 2,776,382 | Jensen | Jan. 1, 1957 |
| 2,871,376 | Kretzmer | Jan. 27, 1959 |
| 2,873,367 | Zawels | Feb. 10, 1959 |
| 2,884,545 | Houck | Apr. 28, 1959 |

FOREIGN PATENTS

| | | |
|---|---|---|
| 1,116,650 | France | Feb. 6, 1956 |